United States Patent Office 2,694,734
Patented Nov. 16, 1954

2,694,734

PRODUCTION OF NORMAL OXYGENATED COMPOUNDS

Hugh J. Hagemeyer, Jr., and David C. Hull, Kingsport, Tenn., assignors to Eastman Kodak Company, Rochester, N. Y., a corporation of New Jersey No Drawing. Application April 22, 1948, Serial No. 22,716

4 Claims. (Cl. 260—604)

This invention relates to the production of oxygenated compounds, such as aldehydes and the like. More particularly, however, this invention is concerned with the production of the normal or straight chain compounds such as normal butyraldehyde by a process involving the reaction of an olefinic compound with a source of carbon monoxide and hydrogen wherein the reaction is conducted in a certain manner so that a predominate yield of the normal compound is obtained.

There are a number of publications and patents outstanding which describe the reaction of various types and kinds of olefinic materials, both aliphatic and cyclic, with carbon monoxide and hydrogen and other components in the presence of various catalysts to obtain oxygenated compounds of the class indicated. The most interesting prior art of which I am aware comprises certain foreign descriptions concerning German processes for the reactions of olefins with carbon monoxide and hydrogen. These reactions were caried out in the presence of a solid catalyst comprising cobalt, thoria, magnesia, and kieselguhr in toluene as a diluent. Various temperatures and pressures are described.

It will be observed, however, that with respect to such prior art processes, although oxygenated compounds were obtained, a mixture resulted. For example, in processes for producing butyraldehyde, an amount of isobutyraldehyde of the order of that of the normal butyraldehyde was also produced, as well as a certain amount of ketones. Therefore, in general, in the processes of the prior art, when reactions of the class indicated were carried out, there was the disadvantage that the yield of reaction product contained large amounts of the alpha substituted or iso compound and the like. As is known, the normal or straight chain compound frequently has more value and may be the compound desired in many instances. It is further apparent that, even though in instances where the iso compound produced does have value, if the normal compound is the desired compound there are problems of separation and disposal involved if undue amounts of the iso compound are also produced.

In accordance with the present invention it has been discovered that reactions of the class indicated, namely, the reaction of olefins, carbon monoxide, and hydrogen in the presence of a catalyst, may be carried out in a simple and practical manner so that the yield of the normal or straight chain carbonyl compound predominates.

This invention has for one object the production of oxygenated compounds by a type of reaction wherein large yields of the desired straight chain compound may be obtained. A particular object is to provide a method for the production of oxygenated compounds such as aldehydes wherein the reaction may be directed to the formation principally, or of large amounts of, the normal or straight chain aldehyde. Another object is to provide a process for the reaction of olefins, carbon monoxide, and hydrogen which is carried out in the presence of a predetermined reaction medium. A still further object is to provide a method for the production of normal butyraldehyde which, as produced, contains only a small amount of isobutyraldehyde. Still another object is to provide a simple and less expensive catalyst which functions satisfactorily in the reaction of olefins, carbon monoxide, and hydrogen for the production of oxygenated compounds of the class indicated. Still another obiect is to provide a method for reacting propylene with carbon monoxide and hydrogen whereby the yield of normal butyraldehyde in the reaction product predominates. Other objects will appear hereinafter.

As already discussed above, in the well known reaction of olefins with carbon monoxide and hydrogen, various secondary products may be formed along with the desired primary product. For example, ketones may be formed in amounts up to 30 percent of the weight of the product in the manufacture of aldehydes from olefins, carbon monoxide, and hydrogen. The prior art reaction of olefins with carbon monoxide and hydrogen may be represented by the following equations:

(1) $RCH=CHR + CO + H_2 \rightarrow RCH_2CHRCHO$
(2) $2RCH=CHR + CO + H_2 \rightarrow RCH_2CHRCORCHCH_2R$ where R is hydrogen, alkyl, or aryl.

We have now found that a new and unpredictable result is obtained when the reaction medium, solution, or suspending liquid in which the reaction is carried out is of a certain type as will be described in detail hereinafter. In the prior art it has been customary to employ as the reaction medium such solvents as toluene and the like. In contrast thereto we have found that if certain carbonyl liquids are employed as the reaction medium that the reaction products obtained are materially affected and that yields predominating in the normal or straight chain product may be obtained.

While it is not desired to be bound by any theory concerning the mechanism of our reaction, the following explanations may serve to some extent in arriving at a better understanding of the invention.

The improved result of the present invention can be illustrated by the reaction of propylene with a source of carbon monoxide and hydrogen. The desired reaction is the formation of normal butyraldehyde from the propylene, carbon monoxide, and hydrogen in accordance with the following equation representing the formation of a straight chain or normal aldehyde:

$$CH_3CH=CH_2 + CO + H_2 \rightarrow CH_3CH_2CH_2CHO$$

However, under the prior art conditions of operation there may also be formed substantial amounts of the "alpha methyl" or isobutyraldehyde in accordance with the following equation:

$$CH_3CH=CH_2 + CO + H_2 \rightarrow (CH_3)_2CHCHO$$

That is, when the reaction is carried out in accordance with the prior art using the standard cobalt-thoria-magnesia catalyst suspended or otherwise carried in toluene, ethers, or other prior art reaction mediums a 50:50±10 percent mixture of normal or isobutyraldehyde is usually obtained.

In contrast thereto in accordance with the present invention we have discovered that if the catalyst is suspended, dissolved, or otherwise contained or incorporated in certain ketones and/or aldehydes as the reaction medium that the straight chain or normal aldehyde formation takes place almost to the exclusion of the "alpha methyl" or isobutyraldehyde formation. We have further discovered that the catalyst contained in the reaction medium may be made up of iron carbonyl promoted with cobalt carbonyl. Also cobalt salts of the lower aliphatic acids incorporated in the aforesaid ketone and aldehyde reaction mediums have been found to be useful catalysts for facilitating the reaction of olefinic materials with carbon monoxide and hydrogen. In further regard to the mixed catalyst of iron carbonyl and a cobalt material, such as cobalt carbonyl or a cobalt salt, the ratio of the less expensive and more readily obtainable iron may be 5–10 parts to only 1 part of the cobalt material. We have found that with such a mixed catalyst that the reaction rate thereof is several times greater than the sum of the reaction rates of the same concentrations of comparable iron or cobalt compounds used separately as catalysts.

In the broader aspects the present invention concerns the reaction of a source of an olefinic material with a source of carbon monoxide and hydrogen carried out in the presence of a solution or suspension or the like of a suitable catalyst, preferably the combination cobalt-iron catalyst, referred to above, contained in an aldehyde or ketone as the reaction medium. The reaction is carried out under elevated temperatures and pressures, for example, ranging from 90–175° C. and generally around 140° C.±10° C. and at 40–700 atmospheres, for usual catalyst concentrations. That is, with high catalyst content lower temperature and pressure conditions will give reaction. On the other hand, with smaller catalyst concentrations then the trend would be toward the conditions of higher temperature and/or pressure for comparable reaction rates. Illustrations of some of the reaction mediums of the present invention are as follows: A 2–10 percent solution of a cobalt carbonyl compound in a ketone such as acetone, methyl ethyl ketone, diisopropyl ketone, diethyl ketone, di-n-propyl ketone, acetyl acetone, and cyclohexanone. A suspension of a reduced cobalt catalyst with the composition 36 percent cobalt, 2 percent thoria, 2 percent magnesia, and 60 percent kieselguhr and other similar solid catalysts in suspension in the desired ketone are also suitable in the process of the present invention.

As indicated above, the most economical catalyst comprises iron carbonyl in concentrations of 2–10 percent promoted with cobalt carbonyl or cobalt salts of aliphatic acids incorporated in any of the ketone or aldehyde reaction mediums aforementioned or described below.

A ketone reaction medium is preferred because of its greater stability under conditions of the process and because of the fact that a ketone reaction medium, particularly diisopropyl ketone and di-normal propyl ketone, help to suppress the formation of additional ketones from the reaction. However, the present invention also contemplates the use of an aldehyde reaction medium. That is, as already indicated, aldehyde reaction mediums have also been found to favor the production of the straight chain or normal compound formation. For example, normal butyraldehyde as a reaction medium for containing the catalyst is very useful as the reaction medium in which to react propylene, carbon monoxide, and hydrogen since it is the product of this reaction and facilitates the formation of further normal compound without the contamination of the desired product with hydrocarbon or other materials which have heretofore been used as the reaction medium.

Further understanding of our invention will be had from a consideration of the following specific examples which are set forth primarily for the purposes of illustration.

*Example I*

Eight grams of cobalt carbonyl dimer was dissolved in two hundred grams of methyl ethyl ketone. The solution was charged to a shaker autoclave and two gram moles of propylene together with an excess of carbon monoxide and hydrogen were charged to the autoclave at 2,200–3,500 p. s. i. and 140±10° C. The reaction was complete in 26 minutes and the contents of the autoclave were blown off and condensed. Distillation with added water gave five grams of isobutyraldehyde and 121 grams of normal butyraldehyde azeotropes, or a ratio of normal butyraldehyde to isobutyraldehyde of 24:1.

In a similar run with butanol as the solvent the ratio of normal butyraldehyde to isobutyraldehyde was 1.5/1.

In a similar run with toluene as the solvent the ratio of normal butyraldehyde to isobutyraldehyde was 1.2:1.

*Example II*

Twenty grams of a cobalt catalyst containing 36 parts of cobalt, 2 parts thoria, 2 parts magnesia and 60 parts kieselguhr and reduced 73 percent was suspended in 200 grams of diethyl ketone and charged to a one liter shaker autoclave. Two gram moles of propylene and excess carbon monoxide and hydrogen were charged to the autoclave at 1,500–2,600 p. s. i. and 130° C. ±10° C. The reaction was complete in 34 minutes and the contents of the autoclave were blown off hot and condensed. Distillation in the presence of excess water gave seven grams of isobutyraldehyde and 112 grams of normal butyraldehyde azeotropes, or a ratio of normal butyraldehyde to isobutyraldehyde of 16:1.

In a similar run with the solid catalyst suspended in butanol the ratio of normal butyraldehyde to isobutyraldehyde was 1.1:1.

In a similar run with the solid catalyst suspended in diesel oil the ratio of normal butyraldehyde to isobutyraldehyde was 1.35:1.

*Example III*

Ten grams of iron pentacarbonyl and two grams of cobalt carbonyl were dissolved in 200 grams of diisopropyl ketone and charged to a one liter stainless steel autoclave. Four gram moles of propylene were added and carbon monoxide and hydrogen were charged to the autoclave at 3,000–4,200 p. s. i. and 150° C. ±10° C. The reaction was complete in one hour and 22 minutes and the contents of the autoclave were blown off hot and condensed. Distillation in the presence of excess water gave five grams of isobutyraldehyde and 174 grams of normal butyraldehyde a ratio of n-butyraldehyde to isobutyraldehyde of 35/1.

In a similar run with the same catalyst composition dissolved in butanol the ratio of normal butyraldehyde to isobutyraldehyde was 1.64/1.

*Example IV*

Ten grams of cobaltous acetate and 1.5 grams of triethanolamine were dissolved in 50 cc. of water and diluted to 200 cc. with acetone. The catalyst solution was charged to a one liter shaker autoclave and four gram moles of propylene, carbon monoxide, and hydrogen were pressed in at 3,500–4,500 p. s. i. and 150° C. ±10° C. After an induction period of 1½ hours a rapid reaction took place and a reaction rate of 8.4 gram moles/hour was obtained. The product was blown off and condensed. Distillation gave 19/1 ratio of normal butyraldehyde to isobutyraldehyde.

A similar run with the same buffered catalyst solution in water and butanol gave a ratio of normal butyraldehyde to isobutyraldehyde of 1.14/1.

The buffered catalyst, referred to above, is described in my companion, copending application, Serial No. 22,713, filed April 22, 1948, now Patent No. 2,576,113. In general such type of catalyst comprises any of the usual sources of eighth group catalytic metal such as cobalt and iron contained in a hydroxy medium such as cobalt acetate dissolved in either water or alcohol. Such catalysts are buffered with one or more alkali salts of the aliphatic carboxylic acids, amino acids, alkalis, alkali alkoxides, tertiary nitrogenous compounds, sodium acetate, sodium butylate, barium hydroxide, pyridine, triethanol amine, diethyl amino ethanol, sodium butyrate, triethyl amine, or the like buffering agents described in detail in my companion application.

It is believed that from the above it may be seen that an improved process has been provided wherein predominate yields of the straight chain or normal compound can be obtained from the reaction of olefinic compounds with carbon monoxide and hydrogen. Since the various type of olefins, the gas ratios of carbon monoxide and hydrogen and the like details are already known in the art, such details are not repeated herein but the description has been directed principally to the constitution of the reaction medium in accordance with the present invention whereby the improved results of obtaining predominate yields of the normal compound may be obtained. Likewise, the preferred reaction involving the use of propylene and the utilization of the iron-cobalt type of catalyst has been emphasized. As already indicated, from the economic standpoint the utilization of the less expensive iron catalyst represents a practical advantage from the commercial standpoint in that the need for recovering catalyst, as may be the case when large amounts of expensive cobalt are employed, is minimized or eliminated.

For convenience of reference in the above description and claims in some instances the term "carbonyl liquid" has been used in describing our ketone and/or aldehyde reaction medium. In general it is preferred that these liquids constitute all of the reaction medium excepting for incidental impurities or the like. However, in some instances useful results may be obtained when the reaction medium is comprised of smaller amounts, say one-half to two-thirds of the carbonyl liquid. Therefore, this and other modifications are contemplated by the present invention.

We claim:

1. The process which comprises reacting propylene with carbon monoxide and hydrogen at elevated temperatures and pressures, said reaction being characterized in that it is carried out at least a part of the time in the presence of a reaction medium comprised at least one-half of methyl ethyl ketone.

2. The process of making normal butyraldehyde which comprises reacting propylene, carbon monoxide, and hydrogen at elevated temperatures and pressures in the presence of a buffered catalyst contained in a ketone reaction medium, the process being characterized in that the catalyst contains at least one soluble cobalt salt and at least one soluble alkali metal salt of a weak acid, as a buffering medium all contained in said ketone reaction medium.

3. The process of producing predominant yields of n-butyraldehyde which comprises reacting propylene with carbon monoxide and hydrogen, said reaction being carried out at 90–250° C. and elevated pressures below 300 atm. and in the presence of a catalytic material selected from the group consisting of the metals iron and cobalt, their carbonyls, and carbonyl forming compounds thereof, the process being characterized in that the catalytic reaction is carried out in a reaction medium comprised principally of at least one liquid ketone from the group consisting of acetone, methyl ethyl ketone, diethyl ketone, dipropyl ketone, diisopropyl ketone, acetyl acetone, and cyclohexanone, the amount of said ketone being at least of the order of the total of the other liquid substances present during the reaction.

4. A process of producing a product predominantly comprising n-butyraldehyde which comprises reacting propylene with carbon monoxide and hydrogen at 90–250° C. and elevated pressures below 300 atm. in the presence of an oxo catalyst containing as an essential component a catalytic material selected from the group consisting of the metals iron and cobalt, their carbonyls, and carbonyl forming compounds thereof, the process being characterized by the presence of a reaction medium comprised principally of diethyl ketone.

References Cited in the file of this patent

UNITED STATES PATENTS

| Number | Name | Date |
|---|---|---|
| 2,437,600 | Gresham et al. | Mar. 9, 1948 |
| 2,473,995 | Gresham et al. | June 21, 1949 |
| 2,504,682 | Harlan | Apr. 18, 1950 |

OTHER REFERENCES

"Interrogation of Dr. Ott. Roelen," PB–77705, pp. 43 to 47, Hobart Publ. Co., Washington, D. C.

I. G. Farben, pat. appl'n 173, 291IVd/120, Ludwigshafen, October 3, 1942. Microfilm in TOM Reel 36 which became available to the public March 12, 1946, at the Library of Congress. Translated by Oscar Meyer in book entitled "Oxo Process," pp. 62–63 (1948).